(12) United States Patent
Krueger et al.

(10) Patent No.: US 12,354,339 B2
(45) Date of Patent: Jul. 8, 2025

(54) BIOMETRIC RECOGNITION AND SECURITY SYSTEM

(71) Applicant: Tokenize, Inc., Rochester, NY (US)

(72) Inventors: Evan Krueger, Rochester, NY (US); John Dvorak, West Liberty, IA (US); Melanie Shapiro, Livonia, NY (US)

(73) Assignee: Tokenize, Inc., Rochester, NY (US)

( * ) Notice: Subject to any disclaimer, the term of this patent is extended or adjusted under 35 U.S.C. 154(b) by 0 days.

(21) Appl. No.: 17/493,140

(22) Filed: Oct. 4, 2021

(65) Prior Publication Data

US 2022/0122375 A1    Apr. 21, 2022

Related U.S. Application Data

(62) Division of application No. 17/010,443, filed on Sep. 2, 2020, now Pat. No. 11,138,409.

(51) Int. Cl.
| | |
|---|---|
| *G06V 10/82* | (2022.01) |
| *G06T 7/13* | (2017.01) |
| *G06V 40/12* | (2022.01) |
| *H04L 9/08* | (2006.01) |
| *H04L 9/32* | (2006.01) |

(52) U.S. Cl.
CPC ............. *G06V 10/82* (2022.01); *G06T 7/13* (2017.01); *G06V 40/1353* (2022.01); *G06V 40/1371* (2022.01); *H04L 9/0866* (2013.01); *H04L 9/3231* (2013.01); *H04L 9/3271* (2013.01); *G06T 2207/20084* (2013.01)

(58) Field of Classification Search
CPC ............. G06V 40/1371; G06V 40/13; G06V 40/1353; G06V 10/82; G06T 7/13; G06T 2207/20084; H04L 9/0866; H04L 9/3231; H04L 9/3271; H04L 63/0861; G06F 21/32
See application file for complete search history.

(56) References Cited

U.S. PATENT DOCUMENTS

| | | | |
|---|---|---|---|
| 9,935,948 B2 | 4/2018 | Schultz et al. | |
| 11,138,409 B1* | 10/2021 | Krueger | ............... H04L 9/3271 |
| 11,424,929 B2* | 8/2022 | Taylor | ................... G06V 40/13 |
| 2004/0148509 A1* | 7/2004 | Wu | ........................ H04L 9/0866 |
| | | | 713/186 |
| 2010/0253471 A1* | 10/2010 | Abe | ........................ G06F 21/32 |
| | | | 340/5.83 |
| 2011/0022847 A1* | 1/2011 | Duffy | ................... G06V 40/1365 |
| | | | 713/182 |
| 2019/0243956 A1* | 8/2019 | Sheets | ................... G06F 21/32 |
| 2019/0378142 A1* | 12/2019 | Darnell | ............... H04L 63/0861 |

(Continued)

OTHER PUBLICATIONS

Raffaele Cappelli, D Maio, and D Maltoni. Sfinge: an approach to synthetic fingerprint generation. In International Workshop on Biometric Technologies (BT2004), pp. 147-154, 2004.

(Continued)

*Primary Examiner* — John B Strege
(74) *Attorney, Agent, or Firm* — DUNLAP CODDING, P.C.

(57) ABSTRACT

Biometric recognition systems and methods are described, including a biometric recognition system including a user system with a biometric able to scan a finger and provide an image. From the image, a plurality of features may be extracted to create at least one fingerprint feature vector using a convolutional neural network.

10 Claims, 8 Drawing Sheets

(56) References Cited

U.S. PATENT DOCUMENTS

| | | | | |
|---|---|---|---|---|
| 2020/0279087 A1* | 9/2020 | Seo | ............... | G01S 7/52079 |
| 2020/0314094 A1* | 10/2020 | Shin | ............... | G06V 40/172 |
| 2020/0382494 A1* | 12/2020 | Park | ............... | H04L 63/0428 |

OTHER PUBLICATIONS

Yevgeniy Dodis, Leonid Reyzin, and Adam Smith. Fuzzy extractors: How to generate strong keys from biometrics and other noisy data. In International conference on the theory and applications of cryptographic techniques, pp. 523-540. Springer, 2004.

Ross Girshick. Fast r-cnn. In Proceedings of the IEEE international conference on computer vision, pp. 1440-1448, 2015.

Ian Goodfellow, Yoshua Bengio, and Aaron Courville. Deep learning. MIT press, 2016.

Tsung-Yi Lin, Priya Goyal, Ross Girshick, Kaiming He, and Piotr Dollar. Focal loss for dense object detection. In Proceedings of the IEEE international conference on computer vision, pp. 2980-2988, 2017.

Yonghong Liu, Baicun Zhou, Congying Han, Tiande Guo, and Jin Qin. A method for singular points detection based on faster-rcnn. Applied Sciences, 8(10):1853, 2018.

Dinh-Luan Nguyen, Kai Cao, and Anil K Jain. Automatic latent fingerprint segmentation. In 2018 IEEE 9th International Conference on Biometrics Theory, Applications and Systems (BTAS), pp. 1-9. IEEE, 2018.

Adrian Rosebrock. Deep learning for computer vision with python: ImageNet bundle. PyImageSearch, 2017.

Ruslan Salakhutdinov and Geoffrey Hinton. Semantic hashing. International Journal of Approximate Reasoning, 50(7):969{978, 2009.

Felipe Petroski Such, Shagan Sah, Miguel Alexander Dominguez, Suhas Pillai, Chao Zhang, Andrew Michael, Nathen D. Cahill, and Raymond Ptucha. Robust spatial filtering with graph convolutional neural networks. IEEE Journal of Selected Topics in Signal Processing, 11(6):884{896, 2017.

Pascal Vincent, Hugo Larochelle, Yoshua Bengio, and Pierre-Antoine Manzagol. Extracting and composing robust features with denoising autoencoders. In Proceedings of the 25th International Conference on Machine Learning, pp. 1096-1103, 2008.

Geetika Arora, Ranjeet Ranjan Jha, Akash Agrawal, Kamlesh Tiwari, and Aditya Nigam. Sp-net: One shot fingerprint singular-point detector. arXiv preprint arXiv:1908.04842, 2019.

International Search Report and Written Opinion (PCT/US2021/047318), dated Feb. 25, 2022, 13 pages.

Nguyen Dinh-Luan et al, "Robust Minutiae Extractor: Integrating Deep Networks and Fingerprint Domain Knowledge", 2018 International Conference on Biometrics (ICB), IEEE, Feb. 20, 2018, pp. 9-16, XP033374941, DOI: 10.1109/ICB2018.2018.00013.

Kei Nagai et al, "ZeroBio—Evaluation and Development of Asymmetric Fingerprint Authentication System Using Oblivious Neural Network Evaluation Protocol", Availability, Reliability and Security, 2007. ARES 2007. The Second in Ternational Conference on, IEEE, PI, Apr. 1, 2007, pp. 1155-1159, XP031079703, ISBN: 978-0-7695-2775-8.

Roh Jong-Hyuk et al, "Learning based biometric key generation method using CNN and RNN", 2018 10$^{th}$ International Conference on Information Technology and Electrical Engineering (ICITEE), IEEE, Jul. 24, 2018, pp. 136-139, XP033446540, DOI: 10.1109/ICITEED.2018.8534873.

* cited by examiner

100

```
┌─────────────────────────────────────────┐
│ One or more scans of a fingerprint may  │
│ be obtained via one or more biometric   │
│ sensors and provided to one or more     │
│ processors as one or more images.       │
│                                     102 │
└─────────────────────────────────────────┘
                    │
┌─────────────────────────────────────────┐
│ Optionally, one or more autoencoders    │
│ may be used to process the one or more  │
│ images providing one or more resulting  │
│ images.                             104 │
└─────────────────────────────────────────┘
                    │
┌─────────────────────────────────────────┐
│ One or more features may be detected    │
│ and/or extracted from the one or more   │
│ images or the one or more resulting     │
│ images.                             106 │
└─────────────────────────────────────────┘
                    │
┌─────────────────────────────────────────┐
│ One or more feature vectors may be      │
│ created using detected and/or extracted │
│ feature data.                           │
│                                     108 │
└─────────────────────────────────────────┘
                    │
┌─────────────────────────────────────────┐
│ One or more compressed representations  │
│ of the fingerprint feature vector may   │
│ be provided for each finger.            │
│                                     110 │
└─────────────────────────────────────────┘
                    │
┌─────────────────────────────────────────┐
│ One or more compressed representations  │
│ of the fingerprint feature vector may   │
│ be hashed, binarized, transmitted,      │
│ stored, or combinations thereof.    112 │
└─────────────────────────────────────────┘
```

Fig. 2

```
                    200

┌────────────────────────────────────────────┐
│ User provides claim of identity on user system. │
│                                        202 │
└────────────────────────────────────────────┘
                    │
┌────────────────────────────────────────────┐
│ User system provides challenge to external device. │
│                                        204 │
└────────────────────────────────────────────┘
                    │
┌────────────────────────────────────────────┐
│ User presents finger to biometric sensor of user system │
│ to obtain one or more fingerprint images.   206 │
└────────────────────────────────────────────┘
                    │
┌────────────────────────────────────────────┐
│ One or more fingerprint images processed to provide one │
│ or more compressed representations of the fingerprint │
│ feature vector.                        208 │
└────────────────────────────────────────────┘
                    │
┌────────────────────────────────────────────┐
│ One or more compressed representations of the │
│ fingerprint feature vector used to transform and/or sign │
│ data sent to the external device.       210 │
└────────────────────────────────────────────┘
                    │
┌────────────────────────────────────────────┐
│ One or more compressed representations of the │
│ fingerprint feature vector discarded and/or deleted from │
│ user device.                           212 │
└────────────────────────────────────────────┘
```

FIG. 6

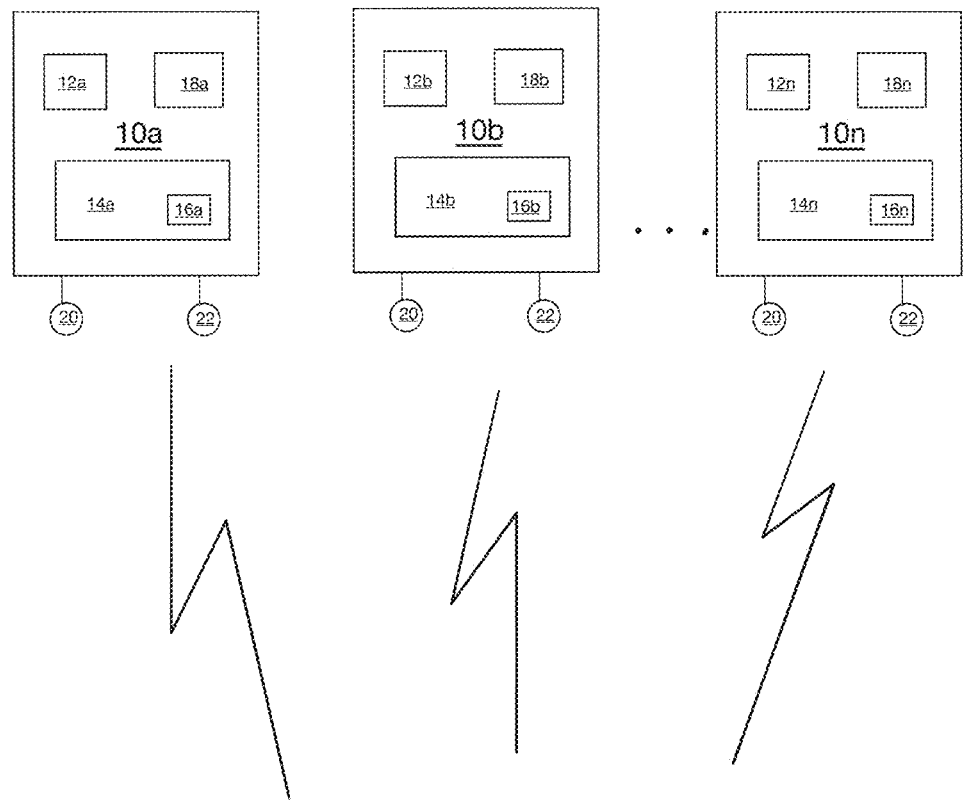
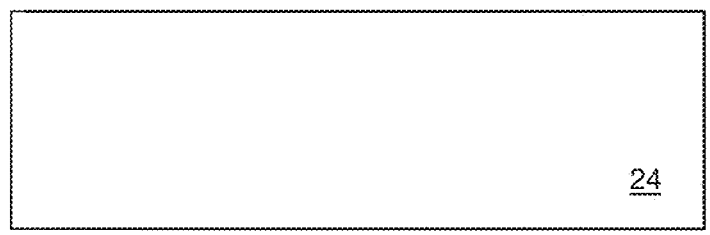
FIG. 7

310 

A first user provides one or more biometric features to the biometric sensor. 312

User system extracts one or more fingerprint representations from the biometric feature. 314

User systems requests one or more encrypted biometric feature templates from the external device. 316

User system compares the biometric feature templates to the fingerprint representations. 318

One or more compressed representations of the fingerprint feature vector used as part of a post-recognition operation. 320

FIG. 8

BIOMETRIC RECOGNITION AND SECURITY SYSTEM

CROSS-REFERENCE TO RELATED APPLICATIONS

This application is a divisional of and claims priority to U.S. patent application Ser. No. 17/010,443, filed Sep. 2, 2020, entitled "BIOMETRIC RECOGNITION AND SECURITY SYSTEM," which is incorporated herein by reference in its entirety.

BACKGROUND

Fingerprints have been used for criminal evidentiary purposes for over a century, but in recent decades, fingerprints have become increasingly associated with automatic authentication/verification and identification systems. The individuality of a fingerprint is not definitely proven and is not the only purportedly unique biometric. Fingerprints, however, are nearly ubiquitous within the population, suitably distinct for discrimination, relatively permanent, and easy to image. As such, fingerprints are an attractive candidate for biometric recognition applications.

Currently, biometric verification in any context may require the retention of a template. The template is a representation of a biometric containing the salient, discriminative information required for matching. Storage of these templates is generally seen as a security risk, as standard methods for encoding the templates are considered to be reversible, meaning the original biometric may be recoverable from its template. Additionally, biometric credentials are not easily reset in the way that a user can create a new password. The draw of using biometrics for recognition is that they may be suitably complex such that the biometrics may be more secure than a short passphrase or similarly weak form of authentication. Even further, biometric verification systems are generally viewed as being intuitive and convenient to use.

Generally, a system used for biometric recognition, whether intended for verification or identification may begin with enrollment. Enrollment involves the registration of an identity. In the case of fingerprint registration, one or more impressions of the fingerprint may be sampled using some kind of sensing device. These captures are often represented as digital images of a fingerprint ridge pattern, but may include additional information captured along with a sampled biometric. From the digital image, feature extraction may be performed resulting in a representation of the biometric that encodes much of the data present in the fingerprint. Using features extracted from one or more sampled fingerprints, the process of template creation synthesizes a representation of the biometric, known as an enrollment template. This enrollment template is stored for subsequent comparisons against query fingerprints, the similarity of which is used to confirm a claimed identity or provide possible matching identities from an enrolled population.

The suitability of any biometric for authentication or identification may be contingent on the biometric containing a unique, identifiable signal that can be extracted and represented stably. These representations may be compact without sacrificing salient information. It is rare for a sampled biometric to be used for comparisons. For example, very few fingerprint verification systems operate by storing and directly matching images. The individual pixel values of the grayscale fingerprint image do not meaningfully correlate with the identity of the user to whom the finger may belong. When fingerprint examiners visually match fingerprints, they instead may compare higher-level features arising from patterns formed by the fingerprint ridges. The features most commonly utilized in fingerprint matching can be broadly categorized into three levels corresponding to the scales at which they are observed: Level 1, Level 2 and Level 3.

Viewed at a global level, meaning the entire ridge pattern taken as a whole, locations where a ridge flow abruptly changes direction are referred to as Level 1 features or singular points. These singularities, identifiable as tight bends or locations of divergence, may be useful in classifying fingerprint patterns and/or establishing coordinate systems relative to which other features can be described, but they alone are not sufficiently distinct for accurate matching.

Minute details within the ridge pattern are most commonly used features in both human and algorithmic fingerprint matching. Individual ridges exhibit a wide variety of interesting local characteristics with the two most commonly occurring and frequently used points being ridge bifurcations and terminations. These are referred to as Level 2 features or minutiae. Distribution of minutiae within the global fingerprint ridge pattern may not be uniform. The constellation of the points and associated attributes, however, is considered distinct enough to match fingerprints with a high degree of accuracy if enough minutiae are present. At an even finer level of detail, intra-ridge attributes, such as ridge width, curvature, and the number of sweat pores may be used in addition to, or in lieu of, minutiae features in the service of extracting even more discriminative information from a fingerprint. Reliably identifying unique features within repeated impressions of the same finger is extremely difficult, and the level of difficulty is inversely proportional to how finely detailed the features may be.

Numerous factors complicate the processing of fingerprint images. The portion of a finger that is placed on the imaging sensor is not guaranteed to be the same between repeated impressions, leading to very little overlap in sets of extracted features. Additionally, the condition of a user's skin can dramatically affect the quality of a biometric signal. While a fingerprint ridge pattern may not often be affected by cuts and abrasions once healed, such injuries, as well as, variations in moisture content of the epidermis of the user may result in different looking images. Elastic distortion may also be an issue, as the angle of approach and pressure used when placing a finger upon a flat sensor surface may result in non-affine transformations of the minutiae and other fine features.

Research into template protection techniques has been conducted for decades. Various protection techniques have been proposed, including non-invertible spatial transforms, polynomial approximation, and linear dimensionality reduction with random multi-space quantization, but the variability inherent in scanned fingerprints coupled with the need to prove reversibility, diversity, renewability, and revocability of protected templates has resulted in little success.

The uses for fingerprint verification systems have not changed dramatically, even in recent years. Sensors are miniaturized and algorithm performance is often compared against a previously acceptable threshold of false acceptance and false rejection rates. Making recognition systems work well enough to be incorporated into personal electronic devices such as phones or credit cards appears to be the focus of large sensor and software companies. Unprotected enrollment templates are retained for matching. When implemented securely, authentication systems used in personal devices store (and, increasingly perform matching of) templates within a co-processor (frequently called a secure element) or process them in a separate execution environment, referred to as a secure enclave. However, the security requirement that the template not leave the protected environment limits the generalization of this authentication method. As biometric use becomes more common, performing an enrollment for every device or service becomes tedious and difficult to manage. In larger corporate and governmental identification systems, classification and indexing may be used to reduce the number of possible matches, but unprotected templates are still stored and compared. As many of these systems are networked and sometimes connected to a broader internet infrastructure, these repositories of highly personal data become attractive targets for hacking and theft. As the ubiquity of biometric access grows, this data will only increase in value.

For a biometric system to be used at scale and not endanger its enrolled users, it must compare protected templates. Many ideas have been proposed to address the various shortcomings and insecurities inherent in large-scale fingerprint recognition systems, but no one solution offers benefits of non-reversibility, diversity, renewability, and revocability. Academic proposals for template protection schemes are also not yet subject to the kinds of security reviews and audits that may be required of a system in order to validate its robustness for a variety of real-world threat models.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 2 illustrates a flow chart of an exemplary method for providing a unique and/or entropic representation of a finger.

FIG. 7 illustrates a block diagram of an exemplary hybrid system configured to reduce collisions by having identifiers that are both inexact and non-secret in accordance with the present disclosure.

FIG. 8 illustrates a flow chart of an exemplary method of using the hybrid system illustrated in FIG. 7 in accordance with the present disclosure.

DETAILED DESCRIPTION OF EXEMPLARY EMBODIMENTS

Figure 1:
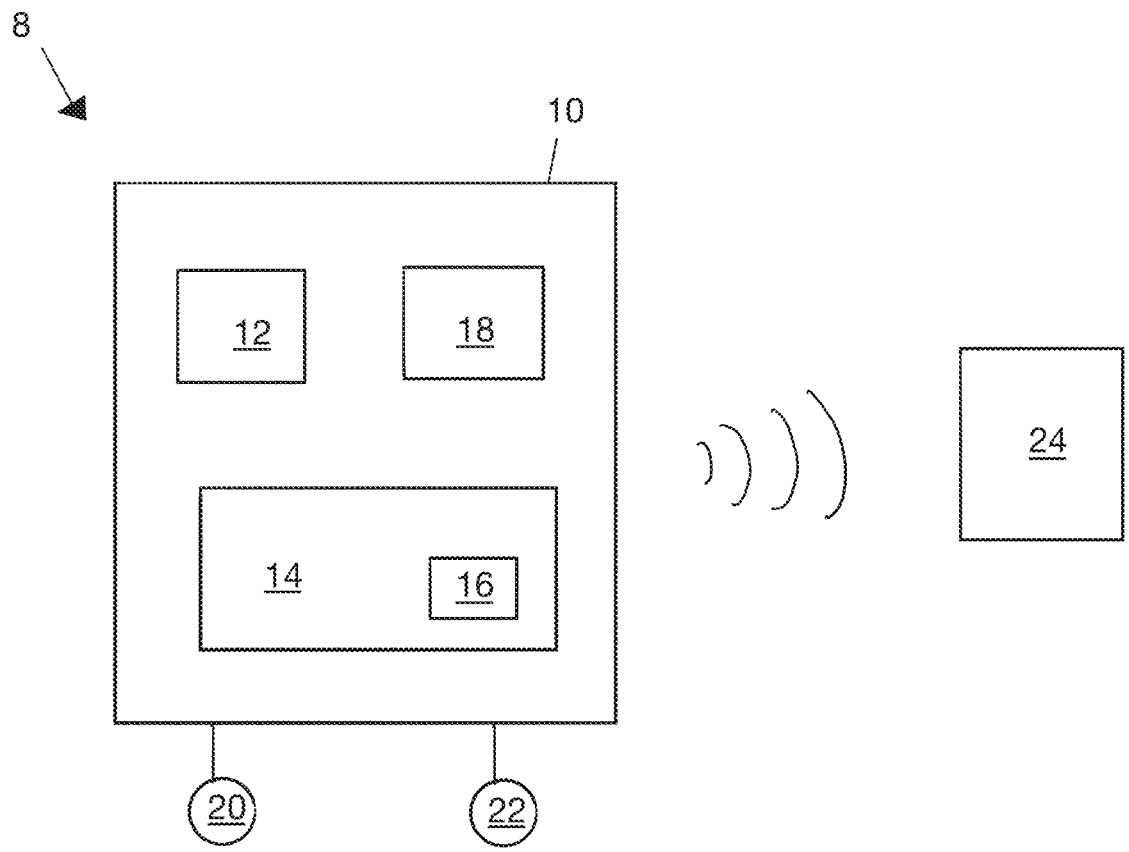
FIG. 1 illustrates a block diagram of an exemplary biometric recognition system for authentication/verification, identification and/or attestation across one or more networks in accordance with the present disclosure.

Before explaining at least one embodiment of the inventive concepts disclosed herein in detail, it is to be understood that the inventive concepts are not limited in their application to the details of construction, exemplary data, and/or the arrangement of the components or steps or methodologies set forth in the following description, or illustrated in the drawings. The presently disclosed and claimed inventive concepts are capable of other embodiments or of being practiced or carried out in various ways. Also, it is to be understood that the phraseology and terminology employed herein is for the purpose of description only and should not be regarded as limiting in any way.

Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

Definitions

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

The term "associate" as used herein will be understood to refer to the direct or indirect connection of two or more items.

Use of the term "plurality" is meant to convey "more than one" unless expressly stated to the contrary.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "recognition" refers to the biometric recognition and the use of anatomical (e.g., fingerprints, face, iris, gait) and/or behavioral (e.g., speech) characteristics (i.e., biometric identifiers, biometric identifiers, biometric characteristics) for recognizing individuals. Depending on application context, biometric recognition may refer to either a verification system, an identification system, or combinations thereof.

The term "biometric verification" refers to authentication of a user's identity by comparison of one or more captured biometric characteristics with a previously captured (or enrolled) biometric reference template (e.g., stored within a system). The biometric verification may include one-to-one comparisons to confirm the claim of identity of a user with either rejection or acceptance of the claim of identity.

The term "biometric identification" refers to recognition of a user by searching an enrollment template database for a match. Generally, biometric identification may include one-to-many comparisons to establish if a user is present within a database and return an identifier of a matching enrollment reference. Using biometric identification, establishment of identity of a user (or lack of enrollment of a user within a database) may be determined without the user having to claim an identity.

The terms "hash function" and "hash algorithm" refer to any function that can be used to map digital data of arbitrary size to digital data of known size. The term "hash" as used herein refers to either the act of using a hash function or to the values returned by the hash function. An exemplary hash function that can be used in accordance with the presently disclosed inventive concepts is SHA-256, which stands for Secure Hash Algorithm Version 2 with a 256 bit digest and was created by the National Security Agency. A description of the SHA-256 algorithm can be found in U.S. Pat. No. 6,829,355 which is hereby incorporated herein by reference.

The term "object detection convolutional neural network" refers to a convolutional neural network trained to detect and localize objects, provide associated bounding boxes, class labels, and confidence and/or probability scores associated with the class labels.

The term "biometric" refers to a distinctive behavioral characteristic, anatomical characteristic, or combinations thereof.

The term "identity" refers to a declaration of who a user is or a representation of a claimed identity.

The term "identifier" refers to a representation, associated representation, mapped representation, or combinations thereof related to an identity.

The term "authentication" refers to verification of a claimed identity.

The term "false acceptance" refers to authentication of a non-matching identity.

The term "false rejection" refers to failure to authenticate a matching identity.

The term "template" refers to a representation of a biometric. The representation may be compressed in some embodiments.

The term "enrollment" refers to registration of a biometric template. In some embodiments, registration may include creation, storage, or combinations thereof.

The term "intra-class variation" refers to differences or changes between captures of a biometric of the same user.

The term "inter-class variation" refers to differences between captures of a biometric from different users.

The term "unprotected template" refers to a representation of a biometric from which an original biometric may be recovered.

The term "protected template" refers to a representation of a biometric from which an original biometric cannot be recovered or approximated with sufficient accuracy or precision.

The term "non-reversibility" refers to computational infeasibility of obtaining the original unprotected template from the protected template.

The term "diversity" refers to the impossibility of matching protected templates enrolled in different systems.

The term "renewability" refers to the ability to produce a large number of protected templates from the same unprotected template.

The term "revocability" refers to the ability to add a protected template to a revocation list and issue a new protected template, invalidating and supplanting the compromised template.

The term "feature" refers to a salient or distinctive attribute.

The term "feature extraction" refers to detection and/or description (e.g., labeling) of features.

The term "feature vector" refers to a collection of descriptors. The descriptors may be used to represent and/or distinguish boundaries, regions, whole images, or combinations thereof.

Referring to the FIGS., and in particular FIG. 1, illustrated therein is an exemplary biometric recognition system 8 for providing a cryptographic key material allowing for authentication/verification, identification and/or attestation across one or more networks in accordance with the present disclosure. The user system 10, or user device, may include one or more biometric sensors 12, one or more processors 14, one or more memories 16 and one or more communication devices 18. Generally, the one or more memories 16 store logic, that when executed by the one or more processors 14, cause the one or more processors 14 to activate the one or more biometric sensors 12 to scan an aspect of a user's physiology, and generate a unique and/or entropic representation of a biometric sample (e.g., fingerprint). In some embodiments, the biometric recognition system 8 may be a single system having each of the one or more biometric sensors 12, one or more processors 14, one or more memories 16, and one or more communication devices 18. In some embodiments the biometric recognition system 8 may include one or more separate system (e.g., physically separate, logically separate) of the one or more biometric sensors 12, one or more processors 14, one or memories 16, and/or one or more communication devices 18.

The one or more processors 14 may be implemented as a personal computer, smart device (e.g., smart phone, smart watch, smart card), network-capable TV set, TV set-top box, tablet, laptop computer, desktop computer, network-capable handheld device, kiosk, electronic voting machine (EVM), automated teller machine (ATM), electronic lock, and/or combinations thereof. The one or more processors 14 may be operably connected to one or more input devices 20 and/or one or more output devices 22.

The one or more processors 14 may include a single processor or multiple processors working independently and/or together to execute the logic described herein. In some embodiments, the one or more processors may or may not be located in a single physical location. Additionally, multiple processors may or may not be located in a single physical location. In some embodiments, the one or more processors may be partially or completely network-based and/or cloud-based. As used herein, the terms "network-based," "cloud-based," and any variations thereof, may include the provision of configurable computational resources on demand via interfacing with a computer and/or computer network, with software and/or data at least partially located on the computer and/or computer network, by pooling processing power of two or more networked processors.

The one or more processors 14 may be able to embody and/or execute the logic of the processes described herein. Logic embodied in the form of software instructions and/or firmware may be executed on the one or more processors 14. For example, logic embodied in the form of software instructions or firmware may be executed on a dedicated system or systems, or on a distributed processing computer system, and/or the like. In some embodiments, logic may be implemented in a stand-alone environment operating on a single computer system or processor and/or logic may be implemented in a networked environment, such as a distributed system using multiple computers and/or processors.

The one or more memories 16 may be implemented as a conventional non-transitory memory, such as, for example, random access memory (RAM), read only memory (ROM), flash memory, combinations thereof, and/or the like, for example. The term non-transitory computer readable medium, as used herein, may be implemented as a single physical device or multiple physical devices of a distributed system that may or may not be logically related. To that end, the one or more memories 16 may be located in the same physical location. Alternatively, the one or more memories 16 may be located in a different location and communicate via a network. Additionally, one or more of the memories 16 may be implemented as a "cloud memory" (i.e., one or more memories may be partially or completely based on or accessed using a network, for example) may be non-transitory computer readable medium including, but not limited to, random access memory, read only memory, flash memory, and combinations thereof. The term non-transitory computer readable medium, as used herein, may be implemented as a single physical device or multiple physical devices of a distributed system that may or may not be logically related.

The one or more memories 16 may store processor executable code and/or information comprising one or more databases and program logic. In some embodiments, the processor executable code may be stored as a data structure, such as a database and/or data table, for example. In some embodiments, a first memory may be designated a permanent memory and a second memory may be designated a temporary memory.

The input device 20 may be capable of receiving information input from a user, and transmitting such information to the one or more processors 14. The input device 20 may be implemented, for example, as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, one or more cameras, LIDAR, time-of-flight imagers and combinations thereof.

The output device 22 may be configured to output information or data in a form perceivable by a user. For example, the output device 22 may be a computer monitor, a screen, a touchscreen, a speaker, a website, a TV set, a smart phone, a PDA, a cell phone, a fax machine, a printer, a laptop computer, and combinations thereof. It is to be understood that the input device 20 and the output device 22 may be implemented as a single device, such as for example a touchscreen of a smartphone or a tablet.

In some embodiments, the user system 10 may include one or more communication devices 18 (e.g., transceiver). The one or more communication devices 18 may be wired or wireless and configured to communicate with one or more external devices 24 as described in further detail herein.

The following description refers to a biometric fingerprint scan for ease of discussion. However, it is understood that the user system 10 may be used with any metric related to a human or animal characteristic as described herein. For example, the biometric scan may be of a face, hand geometry, handwriting, iris, retina, veins, heart rhythm, voice, gait and the like, and the presently disclosed inventive concepts are not limited to fingerprints or a fingerprint scanner/reader. For example, the one or more biometric sensors 12, sometimes referred to herein as a biometric sensor/reader 12, may comprise a fingerprint scanner, a retina scanner, a heart rate monitor, or other sensor to provide a user verification mechanism and ensure that only authorized users are able to actually carry out transactions.

The biometric sensor 12, for example a fingerprint reader/sensor, may be an integral part of the user system 10 or can be separate but connected to the user system 10 in a wired or wireless manner. The design and operation of biometric sensor 12, such as fingerprint sensors (scanners), are understood by those skilled in the art. Non-limiting examples of fingerprint sensors include capacitive sensors, optical sensors, thermal sensors, pressure sensors, radio frequency (RF) sensors, ultrasonic sensors, capacitive and/or the like. In some embodiments, the biometric sensor 12 may support the use of three-dimensional scans of a finger generated via depth scanning (e.g., structured light, time-of-flight, LIDAR and the like) or photogrammetry, for example.

In some embodiments, the biometric sensor 12 may include a swipe fingerprint reader/sensor (sometimes referred to as a fingerprint scanner), whereby a user may drag an upper part of one or more fingers across the fingerprint reader/sensor. As such, the fingerprint reader/sensor operates when a user swipes a finger. The fingerprint reader/scanner may provide one or more scans of a fingerprint. One or more scanned fingerprint images may be accumulated via one or more partial images as a finger moves across a scan area. Details of the one or more scanned fingerprint images may be utilized as described in further detail herein.

In some embodiments, the biometric sensor 12 may include a static fingerprint reader/sensor, wherein a user places one or more fingers motionless on a surface. Generally, the static fingerprint reader/sensor includes a sensor array as large as the area of the scanned fingerprint image to be captured (e.g., image of at least one or more fingers).

Referring to FIG. 2, shown therein is a flow chart 100 of an exemplary method for providing a unique and/or entropic representation of a finger. Generally, the method creates a stable representation from extracted features of an image without storage or knowledge of information about the user presenting his or her finger to the biometric sensor 12. In a step, 102 one or more scans of a fingerprint of a user may be obtained via the one or more biometric sensors 12. The one or more scans may be provided to the one or more processors 14. In some embodiments, the one or more scans may be provided to the one or more processors 14 as one or more scanned fingerprint images 30 (e.g., two dimensional image, three-dimensional image) as shown in flow diagram 28 in FIG. 3. In some embodiments, the one or more scans may be digital images.

Figure 3:
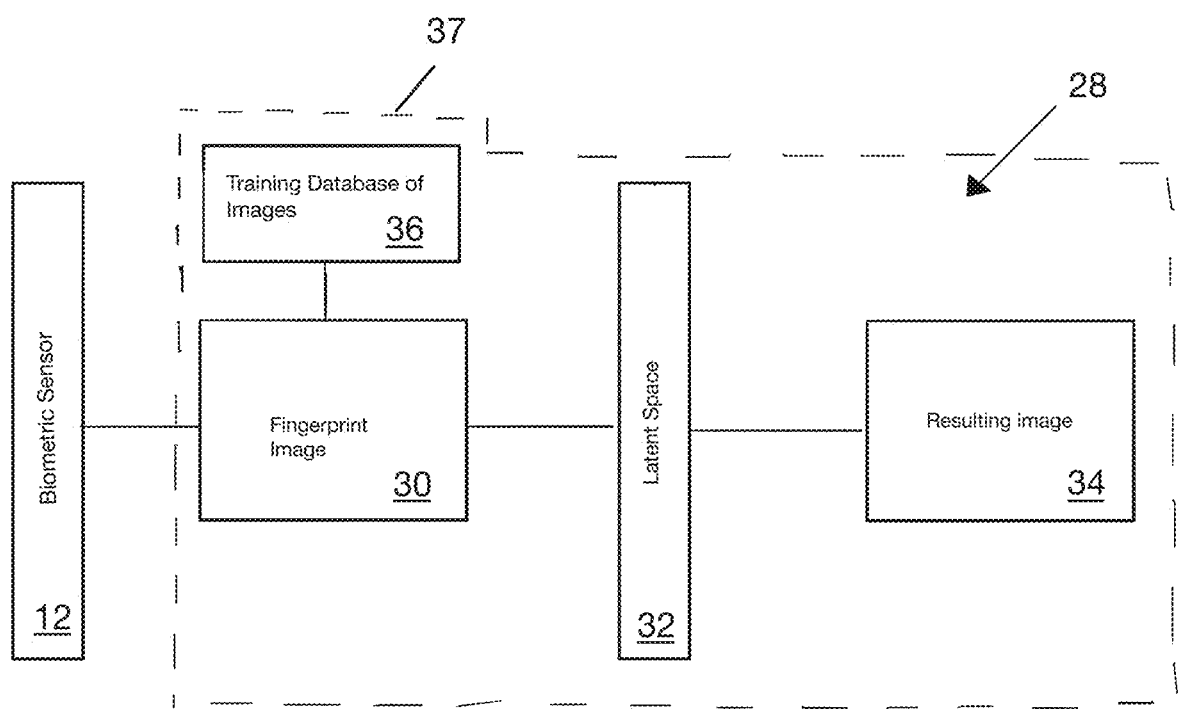
FIG. 3 illustrates a flow diagram of an exemplary method for processing one or more scanned images to reduce noise, variations in contrast and/or compression artifacts within the one or more scanned images in accordance with the present disclosure.

Referring to FIGS. 2 and 3, the one or more scanned fingerprint images 30 may be processed prior to feature detection and extraction to reduce noise, variations in contrast and/or compression artifacts within the one or more images including, but not limited to, quantization, compression, random electrical noise, variations in brightness across surfaces of the biometric sensor 12, and/or the like. In a step 104, in some embodiments, one or more autoencoders 32 (e.g., denoising autoencoders) may optionally be used to process the one or more scanned fingerprint images 30 to adjust for noise, compression artifacts, and/or variations in contrast within the image 30 and provide a second image 34, referred to herein as a resulting image. For example, one or more autoencoders 32 may be used to adjust one or more scanned fingerprint images 30 for local variations in image contrast resulting from uneven pressure provided by the user and/or epidermal moisture content of the user. In some embodiments, the one or more autoencoders 32 may be in the form of a representation learning algorithm comprised of an encoder and decoder function. Inputs may be transformed into a latent representation (e.g., lower dimensionality) by the encoder. The decoder uses the latent representation to recreate the input providing the second image 34.

In some embodiments, the one or more autoencoders 32 may include at least one preprogrammed autoencoder. The preprogrammed autoencoder may be trained via a database 36 of a plurality of synthetically created fingerprint images and/or real fingerprint images prior to processing of the image(s) 30 during training 37. In some embodiments, training 37 using database 36 on one or more images may be performed as a separate process.

In some embodiments, the database 36 may include one or more ground truth datasets (e.g., ground truth ridge dataset) such that the autoencoder 32 (e.g., denoising autoencoder), during processing of the images 30, may be configured to remove noise, compression artifacts and/or variations in contract, including, but not limited to smudges, latent fingerprints, repair holes, repair breaks in ridges, improve contract in areas of high pressure/low pressure, improve contrast in areas of high moisture/low moisture.

In a step 106, one or more features (e.g., fingerprint features) may be detected and/or extracted from the second image 34. In some embodiments, the fingerprint features may be minutiae of the fingerprint. Processes for detecting and/or extracting one or more fingerprint features from the second image 34 may include, but are not limited to, image thresholding and skeletonization, frequency and wavelet analysis, ridge tracing, linear and parabolic symmetry spatial filtering, multi-layer perceptron classification of rank-Gabor filter banks, and/or the like.

Figure 4:
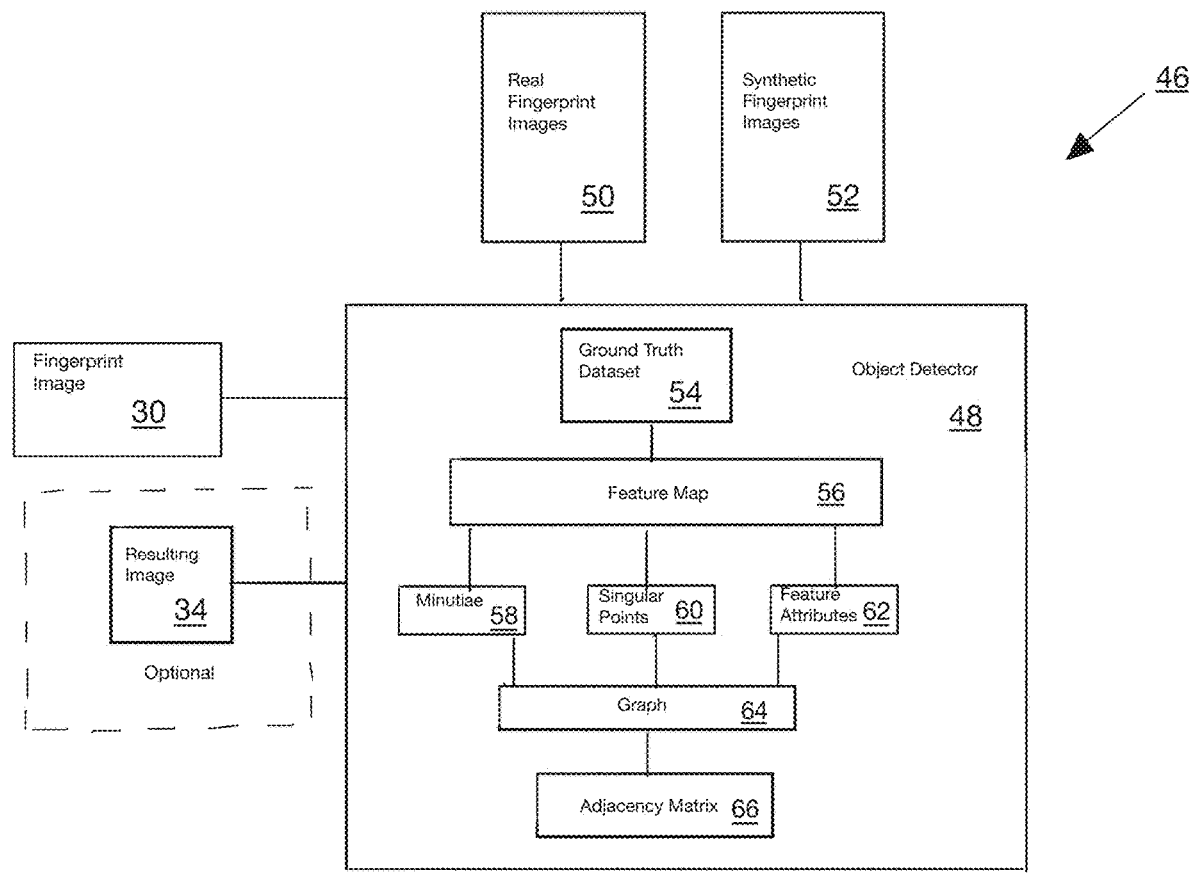
FIG. 4 illustrates a flow diagram of an exemplary method of using a convolutional neural network to localize and classify one or more objects within one or more image(s) in accordance with the present disclosure.

In some embodiments, one of more fingerprint features may be extracted via a convolutional neural network (e.g., region-proposal convolutional neural networks (RCNNs), single-shot detectors (SSDs), and the like) configured to localize and classify one or more objects within the second image(s) 34. FIG. 4 illustrates a flow diagram 46 of an exemplary method of using a convolutional neural network to localize and classify one or more objects within the second image(s) 34. Generally, an object detector 48 may be trained using a plurality of hand-labeled images 50 of real fingerprints and a plurality of synthetically generated images 52 of fingerprints. Training may provide ground truth dataset(s) 54 having locations of minutiae within the synthetically generated images 52.

Referring to FIGS. 1 and 4, the object detector 48 may receive the second image(s) 34 from the one or more processors 14 and detect one or more minutiae and/or singular points within the second image(s) 34 from one or more feature maps 56. The object detector 48 extracts the detected minutiae 58 and/or singular points 60 from the feature map(s) 56. Generally, the location of minutiae 58 within the second image 34 may also be used to extract feature attributes 62 from the second image 34. Feature attributes 62 may include, but are not limited to, class of minutiae 58, direction of minutiae 58, class of singular points 60, direction of singular points 60, and/or the like. In some embodiments, additional data may also be extracted directly from the feature map(s) 56 at location(s) corresponding to detected feature(s). Such data may be used to further teach the objector detector 48 to accurately and/or precisely identify and/or classify features in subsequent uses.

Figure 5A:
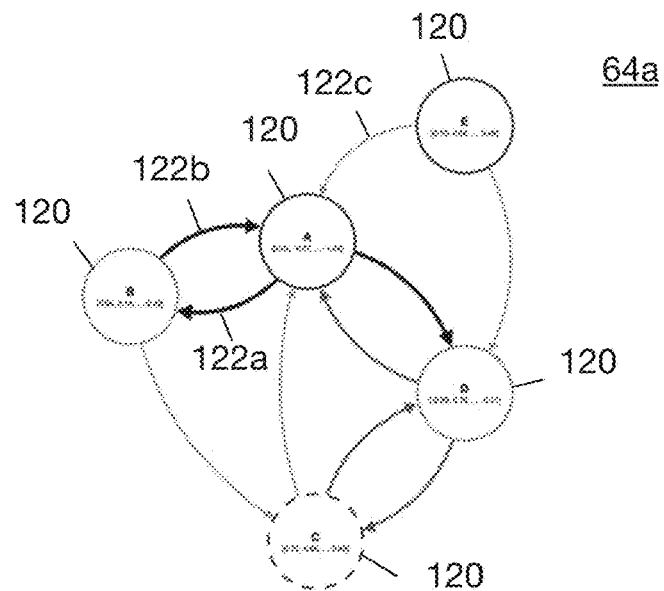
FIGS. 5A and 5B illustrate diagrams of exemplary formation of FIG. 6 illustrates a flow chart of an exemplary method for recognizing one or more users using biometric key-signing recognition.
Figure 5B:
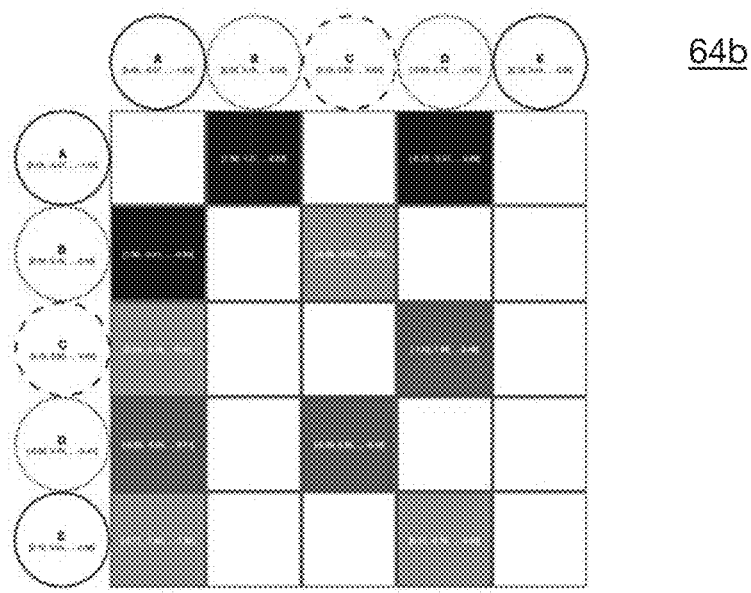

As illustrated in the flow diagram 46 of FIG. 4 data may be incorporated into one or more graphs 64. Generally, the graph 64 is a set of elements that are related to each other. FIGS. 5A and 5B illustrate exemplary graphs 64a and 64b having a plurality of nodes 120. Each node 120 may represent detected minutiae 58 and/or singular points 60, as well as, feature attributes 62. Relations between the nodes 120 may be modeled as connections known as edges 122. Edges 122 between nodes 120 may denote connectors. For example, edges 122 may include one or more feature attributes wherein the one or more feature attributes (e.g., number of ridges between edges, distance from edge to a singular point, local texture or spectral histogram data) may describe the nature of the relationship and/or connection between nodes 120. For example, minutiae in the graph 64 of a fingerprint may be described by location, orientation and/or type with edges 122 being direction and/or number of ridge crossings. FIG. 5A illustrates a graph 64a having nodes 120. Different border lines of each node 120 may represent different classes. Additional attributes, such as an associated feature vector, may also be provided. Edges 122 distinguish the relationship between nodes 120 that are related or are adjacent. For example, for the relationship between Node A and Node B, Node A is related or adjacent to Node B illustrated by the edge 122a. Node B is connected or adjacent to Node A illustrated by the edge 122b. Node E is also connected to or adjacent to Node A illustrated by edge 122c; however, Node A is not connected nor adjacent to associated Node E. Width and shade of each edge 122 may convey additional information such as distance or strength of the relationship, for example.

FIG. 5B illustrates the data within FIG. 5A with each row and column assigned to particular nodes 120. For example, Node B is assigned to the second row and second column. Each row and column illustrates the relationship between each node 120. Shades of each represented square within the matrix may convey the information represented by each edge 122 as detailed in FIG. 5A.

The representation of the fingerprint via the graph 64 having nodes 120 and edges 122 may thus be useful in that if one or more minutia is missing or one or more spurious features are included, only edges 122 local to that particular region may be affected. Local regions may be characterized by local relational attributes with all localizations forming an entirety of the graph 64. Generally, data identified by the object detector 48 may be used in subsequent steps as described herein. To that end, all feature data identified by the object detector 48 may be available for use during subsequent steps outlined below.

Referring to FIG. 2, in a step 108, one or more feature vector(s) may be created using feature data identified by the object detector 48. Generally, attributes of each feature may be defined relative to one another. Additionally, due to variations in physical condition of a finger, condition of the biometric sensor 12, not all features may be present in subsequent scans of the same finger. As such, feature vector creation is able to accept a variable number of input features, tolerate absence of previously sampled features, and/or ignore presence of potentially spurious features as described in further detail herein.

Referring to FIG. 4, from the graph 64, one or more adjacency matrices 66 may be created. The one or more adjacency matrices 66 may include relative location information for one or more salient features in the image (e.g., fingerprint). In some embodiments, the one or more salient features may be as determined by one or more algorithms, traditional fingerprint matching, and/or determined using the methods as described herein. In some embodiments, the adjacency matrix 66 may be a square matrix of N×N dimension, wherein N may be the number of nodes in the graph 64. Values of individual elements within the adjacency matrix 66 may reflect presence of an adjacency or edge. These elements may also represent attributes of the nodes or edges (e.g., minutia class, angle, feature vectors describing local region around a minutia, and the like). In some embodiments, the adjacency matrix 66 may be a higher dimensional matrix (e.g., N×N×m) wherein m may be a length of the feature vector or list of attributes associated with each (N×N) node within the matrix, for example. In some embodiments, the adjacency matrix 66 may be padded such that each and every adjacency matrix 66 for each representation of the fingerprint is the same size. For example, the adjacency matrix 66 provided by the graph 64 may be padded to match dimensions of data on which the object detector 48 was trained. It should be noted that the size of the padding is based on design considerations. In some embodiments, size of the padding may accommodate a maximum number of expected and/or permitted minutiae 58. For example, if the second image 34 includes minutiae 58 in excess of images processed and stored in the ground truth dataset 54, then the excess of minutiae 58 may be discarded. To that end, in some embodiments, a CNN (i.e., GraphCNN) may be trained via the synthetically generated images 52 and/or real fingerprint images 50 to provide exemplary graphs 64. As such, once the Graph CNN is trained on a sufficient number of synthetically generated fingerprint images 52 and/or real fingerprint images 50, the output of the GraphCNN may be used as a feature vector. For example, the Graph CNN may be trained on data extracted from minutiae in a plurality of fingerprint images 50 and 52 such that the Graph CNN may be able to classify one or more fingerprint images, with each class representing a different person. During training, the Graph CNN may be configured to distinguish between one or more persons and accurately classify data provided from around minutiae in fingerprint images for one or more persons, for example. Representations may thus be substantially similar for graphs 64 obtained from the same finger of the user.

Referring to FIG. 2, in a step 110, one or more compressed representations of the feature vector (e.g., fingerprint feature vector) may be provided for each finger. In some embodiments, a second autoencoder may be used to provide one or more compressed representations of the feature vector. Generally, the autoencoder includes an encoder and decoder function. The encoder function may transform the one or more feature vectors into one or more latent representations, with the one or more latent representations generally having a lower dimensionality than the feature vector being input. In some embodiments, the encoder may be trained to encode data deemed important (e.g., data deemed useful from the feature vector from the GraphCNN) from the input into the one or more latent representations. The decoder function may then attempt to recreate the original feature vector from the latent representation. The reconstruction error (i.e., mismatch between the feature vector that is input and the latent representation) may be used to further train the second autoencoder. In some embodiments, additional or alternative 'cost functions' may be used to train the autoencoder. For example, data deemed useful from the feature vector may be used to train the autoencoder, and in addition, further actions may be taken including, for example, minimizing intra-user variation.

In some embodiments, the autoencoder may also be trained by adding noise to the latent representation. The additional noise may result in the encoder function and/or decoder function being noise tolerant in reconstruction. As such, similar feature vectors may be mapped to the same output. Further, the dimensionality of the output may be reduced such that the end result (e.g., output of the decoder or latent representation) of the autoencoder may be a binary feature vector (e.g., 32 bits in length). Denoising may provide for creation of a stable, compressed representation of the fingerprint feature vector for sample of the same finger.

In some embodiments, a variational autoencoder (VAE) may be used to provide one or more compressed representations of the feature vector (e.g., fingerprint feature vector). Generally, the VAE is a generative model configured to model the continuous latent space of an input. The VAE may optimize for both reconstruction loss and Kullback-Leibler (KL) divergence between learned latent distribution and prior distribution. By adjusting the learned parameters of the latent space, feature vectors from different fingers would thus map to different output representations.

Referring to FIG. 2, in a step 112, the one or more compressed representations of the feature vector (e.g., fingerprint feature vector), may be binarized, hashed, transmitted, stored, or combinations thereof.

Referring to FIGS. 1, 3 and 6, an exemplary method for using the one or more compressed representations of the feature vector (e.g., fingerprint feature vector) may include biometric key-signing authentication. FIG. 6 is a flow chart 200 of an exemplary method for authenticating one or more user systems 10 using biometric key-signing authentication. In a step 202, a user may provide a claim of identity on the user system 10. For example, the user may provide identity data including, but not limited to, username, Driver's License number, Social Security number, employee number, non-secret biometric data and/or the like.

In a step 204, the user system 10 may provide a challenge (i.e., answer/response) to the external device 24. The challenge may include, but is not limited to, random data, hashed representation of a document and/or transaction, public key, and/or the like). In a step 206, the user may present a finger to the biometric sensor 12 of the user system 10 to scan one or more images 30. In a step 208, the one or more images 30 may be processed to provide one or more compressed representations of the fingerprint feature vector in accordance with the present description. In a step 210, the one or more compressed representations of the fingerprint feature vector may be used to transform and/or 'sign' data sent to the external device 24. In some embodiments, the compressed representations of the fingerprint feature vectors may be combined with transmitted data to form a transformed representation.

In some embodiments, the one or more compressed representations of the fingerprint feature vectors may be transformed into a prime number to be used directly to sign a piece of data (e.g., document). Such transformation may prove intent of the user to 'sign' a legal document, for example.

In some embodiments, the one or more compressed representations of the fingerprint feature vectors may be used with a random number generator further generating cryptographic key material configured to be used for any and all existing cryptographic functions. For example, output of the compressed representations of the fingerprint feature vectors may be transformed via a private/public keypair (e.g., Rivest-Shamir-Adleman (RSA), Elliptic Curve Digital Signature Algorithm (ECDSA)) using key derivation functions (e.g., Public-Key Cryptography Standard series (e.g., PBKDF2), message authentication code (e.g., HMAC)). To that end, the transformed representation may be computationally irreversible. Such keys may be used for data integrity (e.g., validation of medical records), encrypting data on a trusted computing device, and/or the like.

In some embodiments, the one or more compressed representations of fingerprint feature vectors may be combined (e.g., via a seeded key derivation function), with a personal identification number (PIN), password, and/or the like to provide additional security for the key as the key may be generated only by a combination of user factors that also include the biometric features of the user, for example. As such, the user may need to be physically present with the biometric features to authorize key generation with a password or PIN, for example. Such a system provides a two-factor authentication without use of the external device 24 and/or storage of biometrics on the user system 10.

In some embodiments, the one or more compressed representations of the fingerprint feature vectors may be used for purpose-specific derivation to generate or re-generate one or more keys for one or more purposes. To that end, the one or more compressed representations of the fingerprint feature vectors may be transformed into key material for one or more cryptographic systems. For example, key material may be used as an elliptic curve private key, public key, hash function input, random number generator, compression function, symmetric key, initialization vector, one-time pad, any cryptographic primitive, and/or combinations thereof. The key material may be used alone, or as part of a hierarchical key derivation scheme configured to provide an infinite number of keys for a specific purpose. Further, by using the one or more compressed representations of the fingerprint feature vector as key material, and mixing with purpose specific derivation data, one or more biometrically generated keys may be provided intended for a singular purpose (e.g., signing a document, clocking in to work, decrypting message, and the like). In some embodiments, obtaining one or more biometrically generated keys may be accomplished by combining the fingerprint feature vector key material and a fixed value into one or more key derivation functions, hash function(s), key stretching algorithm(s), or combinations thereof. In some embodiments, the fixed value may be specified and/or particular for a singular purpose (e.g., transaction signing), a specific identity (e.g., work profile), or combinations thereof. In some embodiments, the fixed value may be provided by the user via the one or more user systems 10. Fixed values provided by the user may include, but are not limited to, one or more personal identification numbers (PIN), password(s), secondary biometric(s), traditional cryptographic entropy, or combinations thereof. Generally, the fixed value provided by the user may provide a second factor of authentication for generation of a usable key.

Each purpose may be derived from the same biometric representation, repeatedly, without collisions that link one or more purposes together. Additionally, the user system 10 may be configured to generate a new set of keys for any purpose or for a new identity, whether or not the original keys have been compromised.

In a step 212, the one or more compressed representations of the fingerprint feature vector may be discarded and/or deleted from the user system 10. Additionally, the one or more images 30 and/or any intervening data used to create the one or more compressed representations of the fingerprint feature vector may be deleted and/or discarded from the user system 10. To that end, representations of the fingerprint of the user are never transmitted from the user system 10 as representations of the fingerprint of the user are not stored and/or transmitted. As such, the user system 10 may provide for remote authentication without use of a hardware token, and additionally, may provide security in that extracted representations of the fingerprint of the user are not transmitted and/or stored.

FIGS. 7 and 8 illustrate a hybrid recognition system 300 for use in identification and/or multi-factor authentication/verification with low risk of access credential collisions in accordance with the present disclosure. In populations having growth in the thousands, intra-class and inter-class variations may provide errors and/or collisions. That is, the likelihood of any given person being mistakenly identified as a different enrolled user approaches statistical certainty with greater populations. Even further, in applications having users identified and/or authenticated without hardware credentials, risk for collisions rises.

FIG. 7 illustrates an exemplary hybrid recognition system 300 configured to reduce collisions by having identifiers that are both inexact and non-secret in accordance with the present disclosure. The hybrid recognition system 300 includes multiple user systems 10a-10n communicating over a network 302 with one or more external devices 24. In some embodiments, the network 302 may be a secure network such that each user system 10a-10n may share service and/or company-specific decryption keys. To that end, identifiers may be considered non-secret. In some embodiments, fully encrypted biometric templates may be able to be transmitted securely between the user systems 10a-10n and the external device 24. In some embodiments, the external device 24 may be an external server.

Generally, the hybrid recognition system 300 includes user systems 10a-10n accessible to a plurality of users. In some embodiments, users may be enrolled within the hybrid recognition system 300. In some embodiments, users may be new to the hybrid recognition system 300. In some embodiments, information used in identification and/or authentication/verification of each user may not be stored. For example, in a fingerprint-signing method, biometric data may not be stored. In some embodiments, biometric data may be stored (e.g., an initial inexact identifier). It should be noted that in the hybrid recognition system 300, no data is stored locally on the user system 10 and/or system that the user interacts with.

FIG. 8 illustrates a flow chart 310 of an exemplary method of using the hybrid recognition system 300 illustrated in FIG. 7. In a step 312, a first user may provide one or more biometric(s) (e.g., fingerprints) to the biometric sensor 12a of the user system 10a. In some embodiments, the one or more biometrics and/or representations may be non-secret. In some embodiments, multiple biometrics and/or biometric features may be capable of being captured via the biometric sensors 12a-12n. For example, in some embodiments, the biometric sensor 12a may be configured to capture one or more images of biometrics and/or biometric features in accordance with the present disclosure.

In a step 314, the user system 10a may extract one or more fingerprint representations from the one or more biometric(s). In some embodiments, the fingerprint representation may be the compressed representation of the fingerprint feature vector in accordance with the present disclosure. In some embodiments, the fingerprint representation may include less than a bit-for-bit unique feature vector. To that end, the fingerprint representation may be substantially similar to a second user's biometric (e.g., second user providing biometric to the biometric sensor 12b of the user system 10b).

In a step 316, the user system 10a may request transmission of one or more encrypted biometric feature templates from the external device 24. The one or more encrypted biometric feature templates may be one or more likely potential matches to the fingerprint representation of the biometric features of the user. Likely potential matches may be, for example, representations that may be close together using a distance metric (e.g., inner-product, Hamming distance).

In a step 318, the user system 10a may receive and decrypt the one or more encrypted biometric feature templates of most likely potential matches. The user system 10a may then compare the biometric feature templates with one or more matching techniques. For example, the user system 10a may compare the one or more biometric feature templates with the fingerprint representation of the biometric features of the user using a thresholded similarity comparison. In some embodiments, comparisons may be performed with several fingerprint representations and/or biometric features captured by the biometric sensor 12a. There is no expectation of a correlation between arrangement of minutiae on each finger, and as such, matching of each finger or biometric feature may be treated as an unrelated, independent event. As each is an independent event, compound probability may ensure that the likelihood of false-match approaches zero with a suitable amount of independently matched biometrics.

In a step 320, the one or more compressed representations of the fingerprint feature vector may be used as part of one or more post-recognition operations. To that end, the user system 10a may be authorized to perform actions that may have been guarded via user authentication, for example. If there is not a successful match, the user system 10a is not authenticated. In some embodiments, denial may result in termination of communication between the user system 10a and the external device 24.

In some embodiments, the protected biometric template for a user may be provided to a plurality of user systems 10 (FIG. 1), 10a-10n (FIG. 7), and the like in a multi-device deployable template system. Each user system 10, 10a-10n or the like may support the ability to store and/or compare fingerprint representations of the user against one or more biometric templates on one or more external devices 24. As such, a user may enroll once, deploy the protected biometric templates to each user system 10 owned by the user, and subsequently authenticate each user system 10. Further, one or more protected biometric templates may be stored as an extra copy for security on a remote device while maintaining security and/or without compromising personally identifiable information from the biometric.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

REFERENCES

Geetika Arora, Ranjeet Ranjan Jha, Akash Agrawal, Kamlesh Tiwari, and Aditya Nigam. Sp-net: One shot fingerprint singular-point detector. arXiv preprint arXiv: 1908.04842, 2019.

Raffaele Cappelli, D Maio, and D Maltoni. Sfinge: an approach to synthetic fingerprint generation. In International Workshop on Biometric Technologies (BT2004), pages 147-154, 2004.

Yevgeniy Dodis, Leonid Reyzin, and Adam Smith. Fuzzy extractors: How to generate strong keys from biometrics and other noisy data. In International conference on the theory and applications of cryptographic techniques, pages 523-540. Springer, 2004.

Ross Girshick. Fast r-cnn. In Proceedings of the IEEE international conference on computer vision, pages 1440-1448, 2015.

Ian Goodfellow, Yoshua Bengio, and Aaron Courville. Deep learning. MIT press, 2016.

Tsung-Yi Lin, Priya Goyal, Ross Girshick, Kaiming He, and Piotr Dollar. Focal loss for dense object detection. In Proceedings of the IEEE international conference on computer vision, pages 2980-2988, 2017.

Yonghong Liu, Baicun Zhou, Congying Han, Tiande Guo, and Jin Qin. A method for singular points detection based on faster-rcnn. Applied Sciences, 8(10):1853, 2018.

Davide Maltoni, Dario Maio, Anil K Jain, and Salil Prabhakar. Handbook of fingerprint recognition. Springer Science & Business Media, 2009.

Dinh-Luan Nguyen, Kai Cao, and Anil K Jain. Automatic latent fingerprint segmentation. In 2018 IEEE 9th International Conference on Biometrics Theory, Applications and Systems (BTAS), pages 1-9. IEEE, 2018.

Adrian Rosebrock. Deep learning for computer vision with python: ImageNet bundle. PyImageSearch, 2017.

Ruslan Salakhutdinov and Geoffrey Hinton. Semantic hashing. International Journal of Approximate Reasoning, 50(7):969{978, 2009.

Stephen L Schultz, David R Nilosek, and John Dvorak. Biometric data hashing, verification and security, Aug. 2 2018. U.S. patent application Ser. No. 15/940,115.

Felipe Petroski Such, Shagan Sah, Miguel Alexander Dominguez, Suhas Pillai, Chao Zhang, Andrew Michael, Nathen D. Cahill, and Raymond Ptucha. Robust spatial filtering with graph convolutional neural networks. IEEE Journal of Selected Topics in Signal Processing, 11(6): 884{896, 2017.

Pascal Vincent, Hugo Larochelle, Yoshua Bengio, and Pierre-Antoine Manzagol. Extracting and composing robust features with denoising autoencoders. In Proceedings of the 25th International Conference on Machine Learning, pages 1096-1103, 2008.

What is claimed is:

1. A method, comprising:
receiving, by a user system, at least one scan of a biometric from a user to provide at least one image of the biometric, the user system networked to a server;
processing, at least one fingerprint representation from the at least one image of the biometric, the at least one fingerprint representation being one or more compressed representations of a fingerprint feature vector, the one or more compressed representations of a fingerprint feature vector being an output of a modeling of a fingerprint feature vector of the at least one fingerprint representation by a variational autoencoder;
requesting, by the user system, transmission of at least one biometric feature protected template from the server, the at least one biometric feature protected template configured as a potential match to the at least one fingerprint representation of biometric features of the user;
comparing, by the user system, the at least one biometric feature protected template with the at least one fingerprint representation;
authenticating the user, by the user system, upon a successful comparison match between the at least one biometric feature protected template and the at least one fingerprint representation;
signing, by the user system, data using the fingerprint feature vector of the at least one fingerprint representation; and
transmitting, by the user system, the signed data to at least one external device.

2. The method of claim 1, wherein the at least one external device is the server.

3. The method of claim 1, wherein the at least one scan of the biometric from the user includes a first scan of a first finger from the user and a second scan of a second finger from the user, the first scan providing a first image and the second scan providing a second image, wherein a first fingerprint representation for the first finger is processed from the first image, and a second fingerprint representation for the second finger is processed from the second image, and wherein comparing, by the user system, is defined further as comparing the first fingerprint representation to a first biometric feature protected template and the second fingerprint representation to a second biometric feature protected template using a threshold similarity comparison.

4. The method of claim 3, wherein comparing the first fingerprint representation to the first biometric feature protected template and the second fingerprint representation to the second biometric feature protected template using the threshold similarity comparison is two independent events.

5. The method of claim 4, wherein authenticating the user system is defined further as authenticating the user system upon the successful comparison match of the first fingerprint representation to the first biometric feature protected template and the second fingerprint representation to the second biometric feature protected template.

6. A method, comprising:
requesting, by a user system, transmission of at least one biometric feature protected template from an external device, the at least one biometric feature protected template configured as a potential match to one or more compressed representations of a fingerprint feature vector of at least one fingerprint representation of a biometric feature of a user, the one or more compressed representations of a fingerprint feature vector being an output of a modeling of a fingerprint feature vector of the at least one fingerprint representation by a variational autoencoder;
comparing, by the user system, the at least one biometric feature protected template with the one or more compressed representations of a fingerprint feature vector of the at least one fingerprint representation;
authenticating, by the user system, the user upon a successful comparison match between the at least one biometric feature protected template and the at least one fingerprint representation;
transforming, by the user system, data using the one or more compressed representations of a fingerprint feature vector of the at least one fingerprint representation and a hash function to generate a key; and,
transmitting, by the user system, the key to the external device.

7. The method of claim 6, wherein the user system requests transmission of a first biometric feature protected template and a second biometric feature protected template from the external device.

8. The method of claim 7, wherein the at least one fingerprint representation includes a first fingerprint representation and a second fingerprint representation, and wherein comparing, by the user system, is defined further as comparing the first fingerprint representation to a first biometric feature protected template and the second fingerprint representation to a second biometric feature protected template using a threshold similarity comparison.

9. The method of claim 8, wherein comparing the first fingerprint representation to the first biometric feature protected template and the second fingerprint representation to the second biometric feature protected template using the threshold similarity comparison is two independent events.

10. The method of claim 9, wherein authenticating the user system is defined further as authenticating the user system upon the successful comparison match of the first fingerprint representation to the first biometric feature protected template and the second fingerprint representation to the second biometric feature protected template.

* * * * *